United States Patent
Han et al.

(10) Patent No.: US 12,397,615 B2
(45) Date of Patent: Aug. 26, 2025

(54) AIR-CONDITIONING SYSTEM FOR MOBILITY VEHICLES

(71) Applicants: Hyundai Motor Company, Seoul (KR); Kia Corporation, Seoul (KR); DOOWON CLIMATE CONTROL CO., LTD., Asan-si (KR)

(72) Inventors: Kwang Ok Han, Seoul (KR); Myung Hoe Kim, Seoul (KR); Su Yeon Kang, Seoul (KR); Yeong Jun Kim, Incheon (KR); Kwang Woon Cho, Yongin-Si (KR); Hyo Geun Oh, Cheongju-Si (KR); Won Jun Joung, Uiwang-Si (KR); Byung Guk An, Asan-Si (KR)

(73) Assignees: Hyundai Motor Company, Seoul (KR); Kia Corporation, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 201 days.

(21) Appl. No.: 18/384,137

(22) Filed: Oct. 26, 2023

(65) Prior Publication Data
US 2024/0375479 A1     Nov. 14, 2024

(30) Foreign Application Priority Data
May 8, 2023     (KR) .................. 10-2023-0059273

(51) Int. Cl.
*B60H 1/00*     (2006.01)
(52) U.S. Cl.
CPC ................. *B60H 1/00764* (2013.01)

(58) Field of Classification Search
CPC     B60H 1/00764; B60H 1/3213; B60H 1/3227; B60H 1/00207; B60H 1/0002; B60H 1/00821; B60H 1/00521; B60H 1/00842; B60H 2001/3241; B60H 2001/3266; B60H 2001/3277; B60H 2001/00235; B60H 2001/00085; B60H 2001/0015
See application file for complete search history.

(56) References Cited

U.S. PATENT DOCUMENTS 6,763,670 B1 *   7/2004   Bushnell ............ B60H 1/00542
                                                    62/200

FOREIGN PATENT DOCUMENTS

| CN | 106004339 B | * | 9/2018 | ............ B60H 1/3202 |
| CN | 210310246 U | * | 4/2020 | ............ Y02E 70/30 |
| CN | 212921050 U | * | 4/2021 | |
| DE | 19641635 A1 | * | 4/1997 | ............ B60H 1/323 |
| DE | 602004002862 T2 | * | 5/2007 | ............ B60H 1/039 |
| DE | 602004002771 T2 | * | 8/2007 | ............ B60H 1/323 |
| DE | 602004006988 T2 | * | 2/2008 | ......... B60H 1/00371 |
| DE | 102009028522 B4 | * | 5/2017 | ......... B60H 1/00028 |

(Continued)

*Primary Examiner* — Emmanuel E Duke
(74) *Attorney, Agent, or Firm* — Morgan, Lewis & Bockius LLP

(57) ABSTRACT

An air-conditioning system for mobility vehicles is capable of introducing outside air into a front portion and a rear portion of a housing in which a heat exchanger is mounted and capable of selectively changing the introduction direction of the outside air, adjusting the amount of heat exchange between the heat exchanger and the outside air depending on the travel direction of a mobility vehicle or whether or not a heat pump is used, thus improving the operational efficiency of the heat exchanger.

20 Claims, 4 Drawing Sheets

(56) References Cited

FOREIGN PATENT DOCUMENTS

| EA | 036187 B1 | * | 10/2020 | ............. B60H 1/323 |
| KR | 10-2010-0028739 | | 3/2010 | |
| KR | 20100028739 A | * | 3/2010 | ......... B60H 1/00535 |
| KR | 20220094761 A | * | 7/2022 | ......... B60H 1/00514 |
| WO | WO-2017094391 A1 | * | 6/2017 | ............. B60H 1/323 |

* cited by examiner

AIR-CONDITIONING SYSTEM FOR MOBILITY VEHICLES

CROSS-REFERENCE TO RELATED APPLICATION

The present application claims priority to Korean Patent Application No. 10-2023-0059273, filed on May 8, 2023, the entire contents of which is incorporated herein for all purposes by this reference.

BACKGROUND OF THE PRESENT DISCLOSURE

Field of the Present Disclosure

The present disclosure relates to an air-conditioning system for mobility vehicles, and more particularly, to an air-conditioning system for mobility vehicles capable of selectively changing the introduction direction of outside air to be supplied to an outdoor heat exchanger, adjusting the amount of heat exchange between the outdoor heat exchanger and the outside air depending on the travel direction of a mobility vehicle or whether or not a heat pump is used.

Description of Related Art

In general, an air-conditioning device for a mobility vehicle is a front air-conditioning device, which is configured such that air for cooling or heating is discharged through an outlet formed in an instrument panel provided in the front side of the passenger compartment of the mobility vehicle. Therefore, in the case of a mobility vehicle having a large passenger compartment, a sufficient amount of air-conditioned air does not reach rear seats.

To provide improved cooling/heating effects to rear seats, a rear-seat air-conditioning device or a roof-type air-conditioning device, which is mounted to a roof of a mobility vehicle to discharge air-conditioned air toward the head of a passenger sitting on a rear seat, is applied to mobility vehicles.

A roof-type air-conditioning device is configured such that an outdoor heat exchanger thereof, which exchanges heat with outside air, is mounted to a roof of a mobility vehicle. Therefore, there is a limitation in securing a sufficient amount of outside air to be supplied to the outdoor heat exchanger due to a limited space in the roof.

Recently, various types of autonomous mobility vehicles configured for traveling in opposite directions, i.e., forwards and backwards thereof, have been developed. Conventionally, however, because a portion for introduction of outside air is formed only at the front side of a mobility vehicle, there is a problem in that a sufficient amount of outside air is not supplied to an outdoor heat exchanger of a roof-type air-conditioning device.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air-conditioning system for mobility vehicles configured for selectively changing the introduction direction of outside air to be supplied to an outdoor heat exchanger, adjusting the amount of heat exchange between the outdoor heat exchanger and the outside air depending on the travel direction of a mobility vehicle or whether or not a heat pump is used, thus improving the operational efficiency of the outdoor heat exchanger.

In accordance with the present disclosure, the above and other objects may be accomplished by the provision of an air-conditioning system for mobility vehicles, the air-conditioning system including a housing mounted on an upper portion or a lower portion of a mobility vehicle, the housing including a plurality of air inlets and an air outlet, a heat exchange unit provided in the housing, a plurality of doors mounted in the plurality of air inlets of the housing to open or close the plurality of air inlets, and a controller configured to control the plurality of doors according to predetermined control logic for each situation so that the plurality of doors is opened or closed together or individually.

The plurality of air inlets may be formed in a side surface of the housing, the air outlet may be formed in an upper portion or a lower portion of the housing, and the heat exchange unit may be disposed in the housing so that air flowing from the plurality of air inlets to the air outlet passes through the heat exchange unit.

The plurality of air inlets may include a first air inlet and a second air inlet. The first air inlet may be located at a front portion of the housing to be oriented in the forward direction of the mobility vehicle, and the second air inlet may be located at a rear portion of the housing to be oriented in the backward direction of the mobility vehicle.

The plurality of doors may include a first door mounted in the first air inlet and a second door mounted in the second air inlet.

When the travel speed of the mobility vehicle is equal to or greater than a predetermined speed, the controller may check a travel direction. When the travel direction is the forward direction, the controller may perform control so that the first door is opened and the second door is closed.

When the travel speed of the mobility vehicle is equal to or greater than the predetermined speed, the controller may check the travel direction. When the travel direction is the backward direction, the controller may perform control so that the first door is closed and the second door is opened.

When the travel speed of the mobility vehicle is lower than the predetermined speed, the controller may perform control so that the first door and the second door are opened.

When the mobility vehicle accelerates in the state in which the travel speed of the mobility vehicle is equal to or greater than the predetermined speed, the controller may perform control so that the amount of opening of the first door or the second door is gradually reduced. When the mobility vehicle decelerates in the state in which the travel speed is equal to or greater than the predetermined speed, the controller may perform control so that the amount of opening of the first door or the second door is gradually increased.

The heat exchange unit may include a heat exchanger configured to allow a refrigerant to flow therethrough, and the controller may be configured for controlling the amount of opening of the first door or the second door according to the amount of heat exchange with the heat exchanger.

The controller may perform control so that the first door and the second door are opened when performing a cleaning mode to remove foreign substances present in the housing.

The controller may be configured for controlling opening and closing of the first door and the second door according to predetermined control logic for the previous situation when a predetermined time period elapses after completion of the cleaning mode.

The heat exchange unit may include a heat exchanger and a blower, and the controller may perform the cleaning mode during travel of the mobility vehicle and may perform control so that the blower is not driven.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
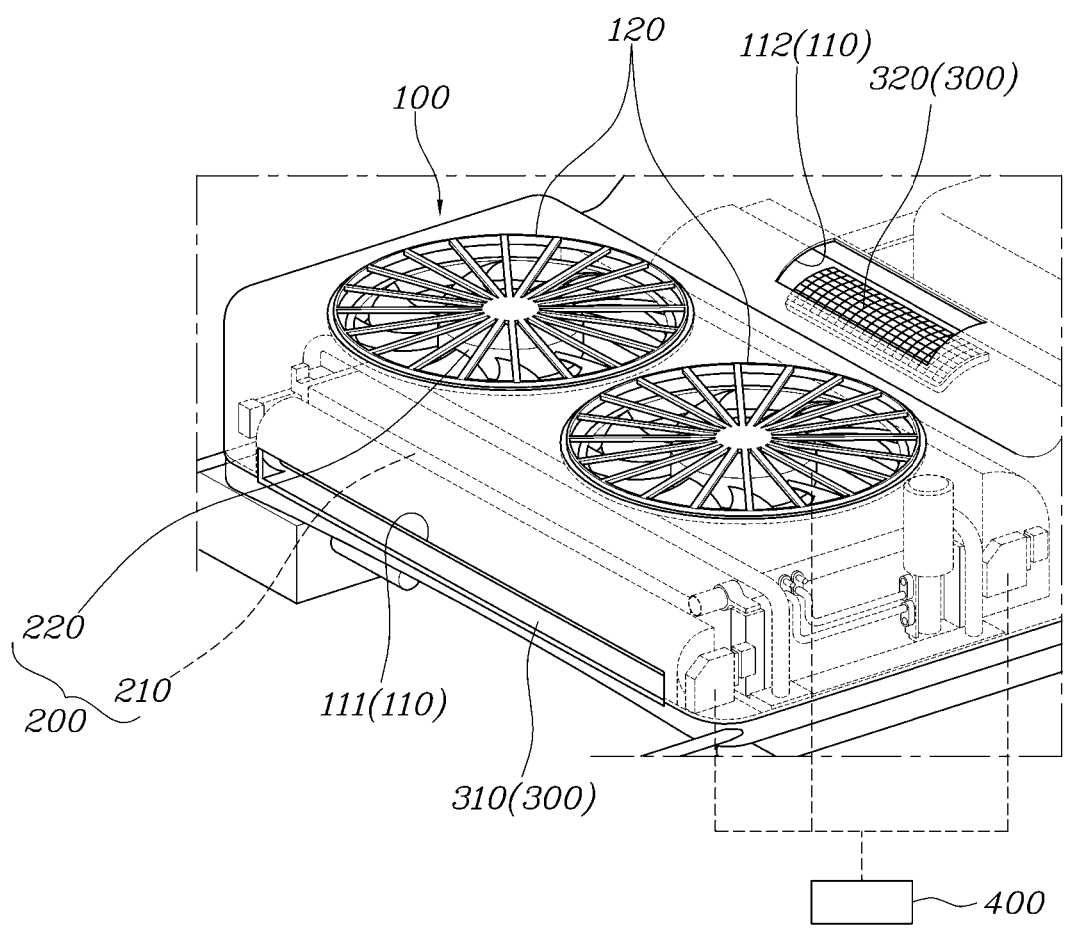
FIG. 1 is a view showing an air-conditioning system for mobility vehicles according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the exemplary embodiments included in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the exemplary embodiments included in the present specification, a detailed description of known functions and configurations incorporated herein will be omitted when the same may make the subject matter of the exemplary embodiments included in the present specification rather unclear. Furthermore, the accompanying drawings are provided only for a better understanding of the exemplary embodiments included in the present specification and are not intended to limit the technical ideas included in the present specification. Therefore, it should be understood that the accompanying drawings include all modifications, equivalents, and substitutions within the scope and spirit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is directed to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

To control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, an air-conditioning system for mobility vehicles according to various exemplary embodiments of the present disclosure will be described with reference to the accompanying drawings.

Figure 2:
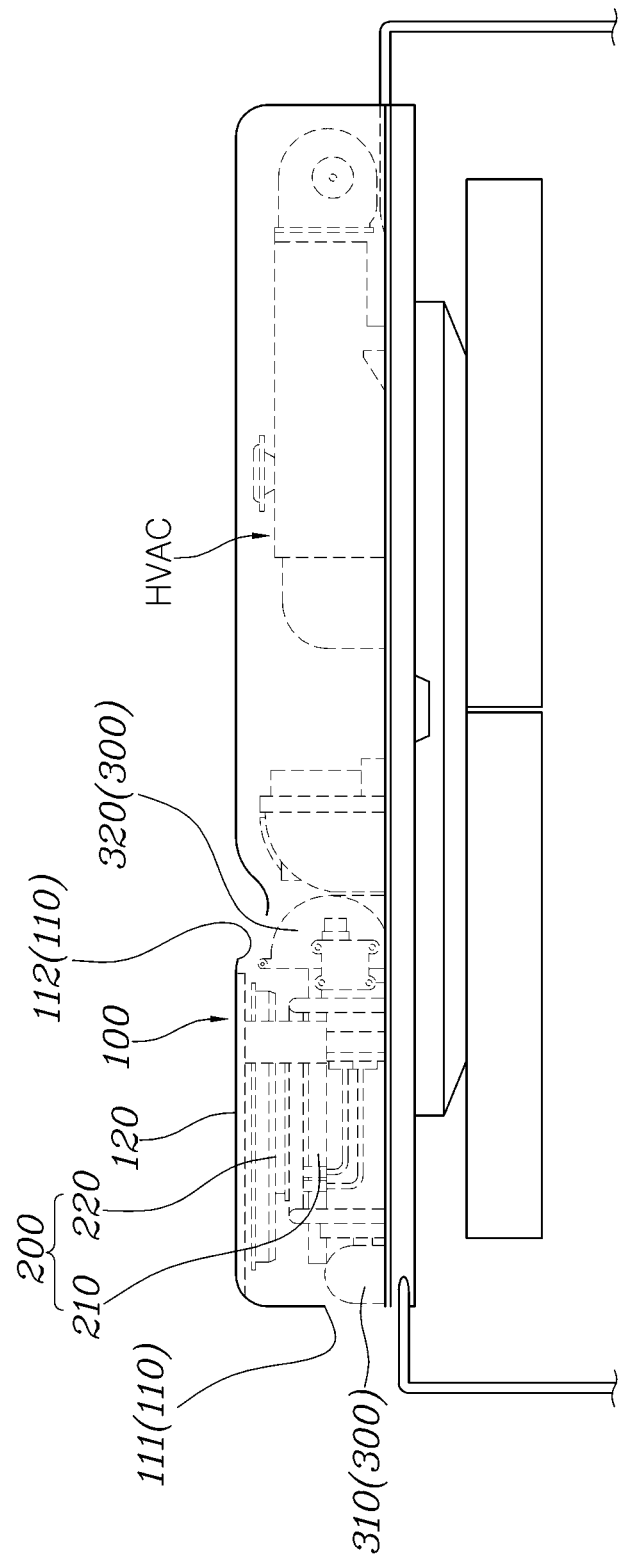
FIG. 2 is a side view of the air-conditioning system for mobility vehicles shown in FIG. 1.
Figure 3:
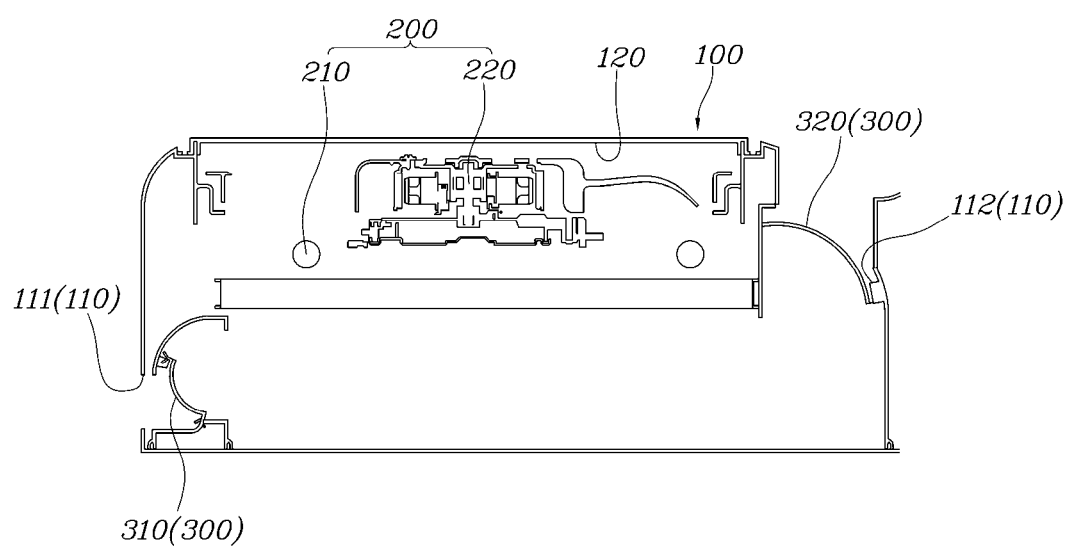
FIG. 3 is a cross-sectional view of a housing of the air-conditioning system for mobility vehicles shown in FIG. 1.

As shown in FIG. 1, FIG. 2, and FIG. 3, an air-conditioning system for mobility vehicles according to an exemplary embodiment of the present disclosure includes a housing 100, which is mounted on an upper portion or a lower portion of a mobility vehicle and includes a plurality of air inlets 110 and an air outlet 120, a heat exchange unit 200, which is provided in the housing 100, a plurality of doors 300, which are mounted in the plurality of air inlets 110 of the housing 100 to open or close the air inlets 110, and a controller 400, which is configured to control the plurality of doors 300 according to predetermined control logic for each situation so that the respective doors 300 are opened or closed together or individually.

The housing 100 may be mounted on the upper portion of the mobility vehicle to form a roof-type air-conditioning system.

Air is introduced into the housing 100 through the plurality of air inlets 110, and the air introduced into the housing 100 is discharged from the housing 100 through the air outlet 120. The plurality of air inlets 110 may be spaced from each other so that air flows into the housing 100 from different directions. The air flowing into and out of the housing 100 may be outside air.

Furthermore, the housing 100 may further include a space for circulation of inside air separate from circulation of the outside air, and a blowing device and a heating, ventilating, and air-conditioning (HVAC) system including an indoor heat exchanger may be provided in the space.

The heat exchange unit 200 may be provided in the housing 100, and may include a heat exchanger 210 and a blower 220. The heat exchanger 210 may be an outdoor heat exchanger configured to allow a refrigerant to circulate therethrough, and the blower 220 may be configured to forcibly blow air. The heat exchanger 210 exchanges heat with outside air circulating in the housing 100 to implement a heat pump in conjunction with refrigerant-circulating components provided in a refrigerant circuit.

The plurality of doors 300 is mounted to the housing 100 to open or close the plurality of air inlets 110. Each of the doors 300 may be mounted in a respective one of the air inlets 110, and may be formed in a dome shape to withstand air resistance when the mobility vehicle travels in the closed state of the doors 300. Each of the doors 300 may be provided with a motor to be individually openable or closable.

The controller 400 may be configured for controlling opening and closing the plurality of doors 300, whereby the amount of outside air to be introduced into the housing 100 or the introduction direction of outside air may vary depending on opening and closing of each of the doors 30.

Control logic for each situation, such as a travel speed, a travel direction, or use or non-use of a heat pump, may be stored in the controller 400. Accordingly, the controller 400 may be configured for controlling opening and closing of the plurality of doors 300 according to the control logic for each situation to change the amount of outside air to be introduced through the plurality of air inlets 110 or the introduction direction of outside air, optimally managing the temperature of the heat exchanger 210 according to each situation.

The present disclosure will now be described in more detail. The plurality of air inlets 110 may be formed in a side surface of the housing 100, the air outlet 120 may be formed in the upper portion or the lower portion of the housing 100, and the heat exchange unit 200 may be disposed in the housing 100 so that air flowing from the air inlets 110 to the air outlet 120 passes therethrough.

Because the plurality of air inlets 110 is formed in the side surface of the housing 100, a sufficient amount of outside air may be introduced into the housing 100 through the air inlets 110 when the mobility vehicle travels. Furthermore, because the air outlet 120 is formed in the upper portion or the lower portion of the housing 100, the outside air introduced into the housing 100 through the air inlets 110 may smoothly flow toward the air outlet 120. In the present way, circulation of the outside air may be stabilized.

Furthermore, the air inlets 110 and the air outlet 120 may be disposed at different vertical heights in the housing 100, and the heat exchange unit 200 may be disposed between the air inlets 110 and the air outlet 120. Accordingly, the outside air flowing from the air inlets 110 toward the air outlet 120 may pass through the heat exchange unit 200.

In detail, the air inlets 110 may include a first air inlet 111 and a second air inlet 112. The first air inlet 111 may be located at a relatively front position to be oriented in the forward direction of the mobility vehicle, and the second air inlet 112 may be located at a relatively rear position to be oriented in the backward direction of the mobility vehicle.

That is, the first air inlet 111 may be formed in a front portion of the housing 100 to be oriented in the forward direction of the mobility vehicle, and the second air inlet 112 may be formed in a rear portion of the housing 100 to be oriented in the backward direction of the mobility vehicle. Accordingly, outside air may be introduced into the housing 100 through the first air inlet 111 when the mobility vehicle travels forward, and may be introduced into the housing 100 through the second air inlet 112 when the mobility vehicle travels backward thereof.

The doors 300 may include a first door 310 mounted in the first air inlet 111 and a second door 320 mounted in the second air inlet 112. Outside air may be introduced into the housing 100 through the first air inlet 111 or the second air inlet 112 depending on opening or closing of the first door 310 and the second door 320.

When the first door 310 is opened while the mobility vehicle is traveling forward, outside air may be introduced into the housing 100 through the first air inlet 111 and may exchange heat with the heat exchange unit 200. In the instant state, when the first door 310 is closed to block the first air inlet 111, introduction of outside air through the first air inlet 111 may be interrupted, and running resistance may be reduced.

When the second door 320 is opened while the mobility vehicle is traveling backward, outside air may be introduced into the housing 100 through the second air inlet 112. In the instant state, when the second door 320 is closed, introduction of outside air through the second air inlet 112 may be interrupted, and running resistance caused by backward travel of the mobility vehicle may be reduced.

As described above, because the first air inlet 111 and the second air inlet 112 are formed in the front portion and the rear portion of the mobility vehicle, respectively, and opening and closing of the first door 310 and the second door 320 are controlled, it is possible to optimize supply of outside air to the heat exchange unit 200 in various situations.

Figure 4:
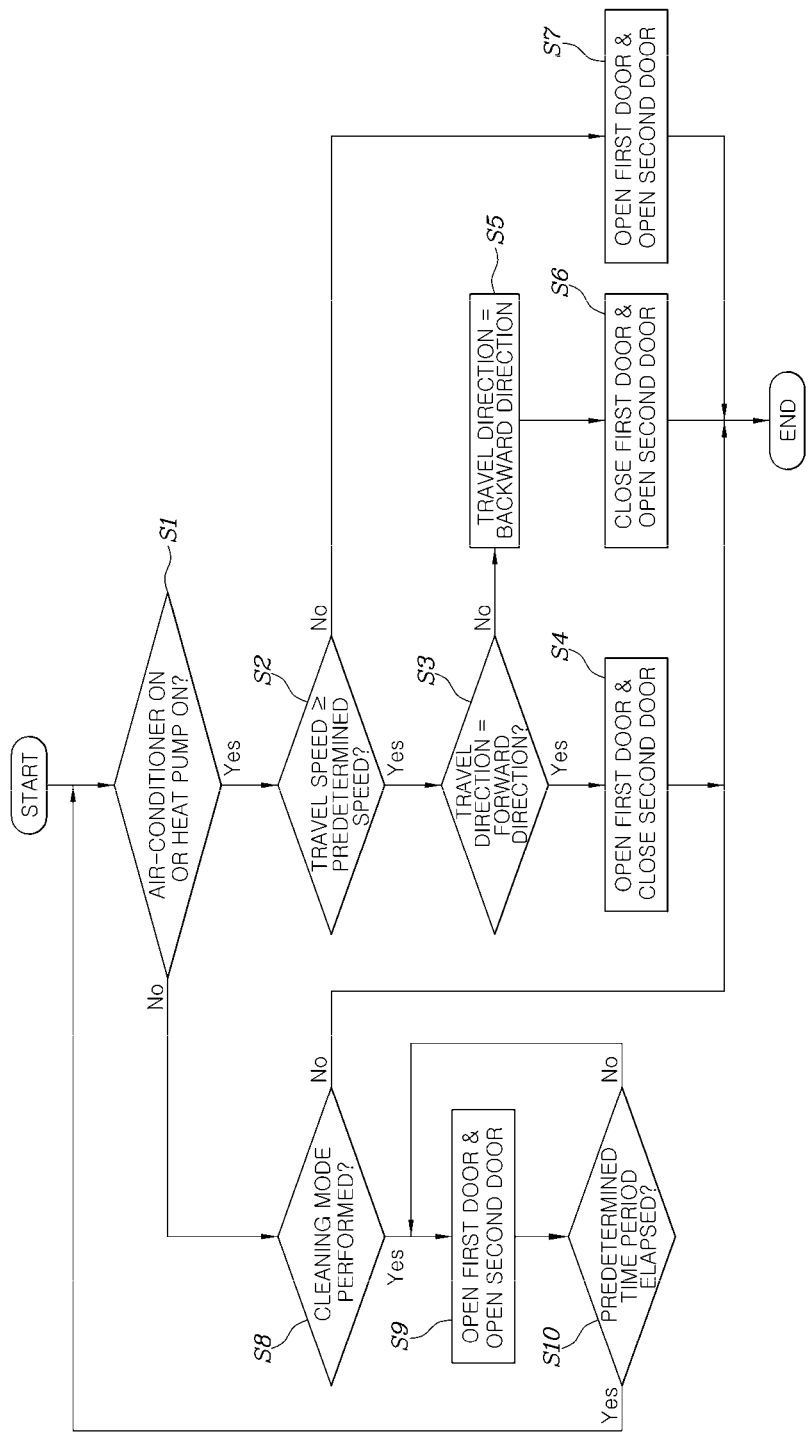
FIG. 4 is a control flowchart of the air-conditioning system for mobility vehicles according to an exemplary embodiment of the present disclosure.

The controller 400 connected to the motors of the first door 310 and the second door 320 may be configured for controlling the first door 310 and the second door 320 in each situation according to steps S1 to S10 shown in the flowchart of FIG. 4.

When the travel speed of the mobility vehicle is equal to or greater than a predetermined speed, the controller 400 may check the travel direction, and when the travel direction is the forward direction, the controller 400 may perform control so that the first door 310 is opened and the second door 320 is closed.

The predetermined speed is a speed set to determine whether the mobility vehicle travels at a high speed. Upon determining that the mobility vehicle is traveling at a speed equal to or greater than the predetermined speed, the controller 400 is configured to determine the travel direction of the mobility vehicle. Upon determining that the travel direction of the mobility vehicle is the forward direction, the controller 400 is configured to control the first door 310 to open to allow outside air to be introduced into the housing 100 through the first air inlet 111, and is configured to control the second door 320 to close to prevent the outside air introduced into the housing 100 through the first air inlet 111 from being discharged from the housing 100 through the second air inlet 112.

In the present way, when the travel speed of the mobility vehicle is equal to or greater than the predetermined speed and the travel direction of the mobility vehicle is the forward direction, the first door 310 is opened, whereby a sufficient amount of outside air may be introduced into the housing 100, and the second door 320 is closed, whereby the outside air introduced into the housing 100 through the first air inlet 111 may not be discharged from the housing 100 through the second air inlet 112 and may exchange heat with the heat exchange unit 200 while flowing toward the air outlet 120.

On the other hand, when the travel speed of the mobility vehicle is equal to or greater than the predetermined speed, the controller 400 may check the travel direction, and when the travel direction is the backward direction, the controller 400 may perform control so that the first door 310 is closed and the second door 320 is opened.

Upon determining that the travel direction of the mobility vehicle is the backward direction, the controller 400 is configured to control the second door 320 to open to allow outside air to be introduced into the housing 100 through the second air inlet 112, and is configured to control the first door 310 to close to prevent the outside air introduced into the housing 100 through the second air inlet 112 from being discharged from the housing 100 through the first air inlet 111.

In the present way, when the travel speed of the mobility vehicle is equal to or greater than the predetermined speed and the travel direction of the mobility vehicle is the backward direction, the second door 320 is opened, whereby a sufficient amount of outside air may be introduced into the housing 100 by backward travel of the mobility vehicle, and the first door 310 is closed, whereby the outside air introduced into the housing 100 through the second air inlet 112 may not be discharged from the housing 100 through the first air inlet 111 and may exchange heat with the heat exchange unit 200 while flowing toward the air outlet 120.

Meanwhile, when the travel speed of the mobility vehicle is lower than the predetermined speed, the controller 400 may be configured for controlling the first door 310 and the second door 320 to open.

As described above, the predetermined speed is a speed set to determine whether the mobility vehicle travels at a high speed. When the travel speed of the mobility vehicle is lower than the predetermined speed, the controller 400 may be configured to determine that the mobility vehicle is traveling at a low speed. Upon determining that the mobility vehicle is traveling at a speed lower than the predetermined speed, the controller 400 may be configured for controlling the first door 310 and the second door 320 to open to introduce a sufficient amount of outside air into the housing 100.

In detail, when the mobility vehicle travels at a low speed, the amount of air introduced into the housing 100 is small. Therefore, both the first door 310 and the second door 320 are opened to allow outside air to be introduced into the housing 100 through both the first air inlet 111 and the second air inlet 112, whereby a sufficient amount of outside air may be introduced into the housing 100.

Furthermore, when the mobility vehicle accelerates in the state in which the travel speed thereof is equal to or greater than the predetermined speed, the controller 400 may perform control so that the amount of opening of the first door 310 or the second door 320 is gradually reduced. When the mobility vehicle decelerates in the state in which the travel speed thereof is equal to or greater than the predetermined speed, the controller 400 may perform control so that the amount of opening of the first door 310 or the second door 320 is gradually increased.

In the present way, the controller 400 adjusts the amount of opening of the first door 310 and the second door 320 depending on the travel speed of the mobility vehicle.

In detail, when the mobility vehicle accelerates in the state in which the travel speed thereof is equal to or greater than the predetermined speed, the controller 400 may perform control so that the amount of opening of the door 300 which is oriented in the travel direction among the first door 310 and the second door 320 is gradually reduced with increase in the travel speed, preventing overcooling of the heat exchanger 210 due to introduction of an excessive amount of outside air into the housing 100 and reducing air resistance, thus securing travel stability at a high speed.

On the other hand, the amount of outside air introduced into the housing 100 is gradually reduced as the travel speed of the mobility vehicle decreases. Therefore, when the mobility vehicle decelerates, the controller 400 may perform control so that the amount of opening of the first door 310 or the second door 320 is gradually increased.

Furthermore, the controller 400 may be configured for controlling the amount of opening of the first door 310 or the second door 320 depending on the amount of heat exchange with the heat exchanger 210.

A refrigerant circulates through the heat exchanger 210 of the heat exchange unit 200, and outside air exchanges heat with the refrigerant flowing through the heat exchanger 210. Accordingly, the temperature of the refrigerant flowing through the heat exchanger 210 is adjusted according to the amount of outside air introduced into the housing 100 through the first air inlet 111 or the second air inlet 112.

A heat pump may be implemented by the heat exchanger 210. The amount of opening of the first door 310 or the second door 320 may be adjusted according to the required temperature condition of the refrigerant through the heat exchanger 210, whereby the amount of heat exchange between the outside air introduced into the housing 100 and the heat exchanger 210 may be adjusted. In the present way, it is possible to manage the temperature of the refrigerant through the heat exchanger 210 when implementing various modes using circulation of the refrigerant, including a heat pump mode, cooling mode and dehumidifying mode.

Meanwhile, the controller 400 may be configured for controlling the first door 310 and the second door 320 to open when implementing a cleaning mode for removal of foreign substances from the housing 100.

The cleaning mode is a mode for removal of foreign substances present in the housing 100. The cleaning mode may be performed to prevent dust from accumulating in the housing 100. The cleaning mode may be performed in response to a received user command, may be automatically performed at a predetermined time interval, or may be performed according to the detected amount of dust accumulated in the housing 100.

In the cleaning mode, both the first door 310 and the second door 320 are opened. In an exemplary embodiment of the present disclosure, outside air introduced into the housing 100 through the first air inlet 111 or the second air inlet 112 flows through the housing 100, and then is discharged from the housing 100 through the air outlet 120. Therefore, dust contained in the outside air may accumulate in the space in the housing 100.

However, when the cleaning mode is performed, both the first door 310 and the second door 320 are opened to open both the first air inlet 111 and the second air inlet 112, whereby outside air may be introduced into and discharged from the housing 100 through the first air inlet 111 and the second air inlet 112, and dust may be discharged from the housing 100 along with the outside air. That is, outside air is caused to flow to the opposite air inlets 110, rather than flowing from the air inlets 110 to the air outlet 120, whereby dust in the housing 100 may be discharged to the outside along with the outside air flowing to the opposite air inlets 110.

The controller 400 may be configured for controlling opening and closing of the first door 310 and the second door 320 according to the control logic for the previous situation when a predetermined time period elapses after completion of the cleaning mode.

Because both the first door 310 and the second door 320 are opened in the cleaning mode, the amount of outside air flowing to the heat exchanger 210 may be reduced. Therefore, when a predetermined time period elapses after completion of the cleaning mode, opening and closing of the first door 310 and the second door 320 may be controlled according to the control logic for the previous situation to secure a sufficient amount of heat exchange with the heat exchanger 210. The predetermined time period may be a time period for which foreign substances present in the housing 100 may be sufficiently removed from the housing 100 by flow of air generated by travel of the mobility vehicle.

The controller 400 may perform the cleaning mode during travel of the mobility vehicle, and may perform control so that the blower 220 is not driven during the cleaning mode.

In detail, the heat exchange unit 200 includes the heat exchanger 210 and the blower 220 configured to cause the air in the housing 100 to be discharged through the air outlet 120 via the heat exchanger 210. Because the cleaning mode is performed by flow of the outside air through the first air inlet 111 and the second air inlet 112, it is necessary not to drive the blower 220 to prevent the outside air from flowing toward the air outlet 120. Accordingly, when the cleaning mode is performed, foreign substances present in the housing 100 may be smoothly removed by the slipstream, i.e., the outside air, flowing through the first air inlet 111 and the second air inlet 112.

As is apparent from the above description, various aspects of the present disclosure are directed to providing an air-conditioning system for mobility vehicles configured for introducing outside air into a front portion and a rear portion of a housing in which a heat exchanger is mounted and configured for selectively changing the introduction direction of the outside air, adjusting the amount of heat exchange between the heat exchanger and the outside air depending on the travel direction of a mobility vehicle or whether or not a heat pump is used, thus improving the operational efficiency of the heat exchanger.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air-conditioning system for a mobility vehicle, the air-conditioning system comprising:
   a housing mounted on an upper portion or a lower portion of the mobility vehicle and including a plurality of air inlets and at least one air outlet;
   a heat exchange unit provided in the housing;
   a plurality of doors mounted in the plurality of air inlets of the housing to open or close the plurality of air inlets; and
   a controller configured to control the plurality of doors according to predetermined control logic so that the plurality of doors is opened or closed together or individually.

2. The air-conditioning system of claim 1,
   wherein the plurality of air inlets is formed in a side surface of the housing,
   wherein the at least one air outlet is formed in an upper portion or a lower portion of the housing, and
   wherein the heat exchange unit is disposed in the housing so that air flowing from the plurality of air inlets to the at least one air outlet passes through the heat exchange unit.

3. The air-conditioning system of claim 1,
   wherein the plurality of air inlets includes a first air inlet and a second air inlet, and
   wherein the first air inlet is located at a front portion of the housing to be oriented in a forward direction of the mobility vehicle, and the second air inlet is located at a rear portion of the housing to be oriented in a backward direction of the mobility vehicle.

4. The air-conditioning system of claim 3, wherein the plurality of doors includes a first door mounted in the first air inlet and a second door mounted in the second air inlet.

5. The air-conditioning system of claim 4,
   wherein, in response that a travel speed of the mobility vehicle is equal to or greater than a predetermined speed, the controller is configured to check a travel direction of the mobility vehicle, and
   wherein, in response that the travel direction is the forward direction, the controller is configured to perform control so that the first door is opened and the second door is closed.

6. The air-conditioning system of claim 4,
   wherein, in response that a travel speed of the mobility vehicle is equal to or greater than a predetermined speed, the controller is configured to check a travel direction of the mobility vehicle, and
   wherein, in response that the travel direction is the backward direction, the controller is configured to perform control so that the first door is closed and the second door is opened.

7. The air-conditioning system of claim 4, wherein, in response that a travel speed of the mobility vehicle is lower than a predetermined speed, the controller is configured to perform control so that the first door and the second door are opened.

8. The air-conditioning system of claim 4, wherein, in response that the mobility vehicle accelerates in a state in which a travel speed of the mobility vehicle is equal to or greater than a predetermined speed, the controller is configured to perform control so that an amount of opening of the first door or the second door is reduced.

9. The air-conditioning system of claim 4, wherein, in response that the mobility vehicle decelerates in a state in which a travel speed is equal to or greater than a predetermined speed, the controller is configured to perform control so that an amount of opening of the first door or the second door is increased.

10. The air-conditioning system of claim 4,
    wherein the heat exchange unit includes a heat exchanger configured to allow a refrigerant to flow therethrough, and
    wherein the controller is configured to control an amount of opening of the first door or the second door according to an amount of heat exchange with the heat exchanger.

11. The air-conditioning system of claim 4, wherein the controller is configured to perform control so that the first door and the second door are opened in performing a cleaning mode to remove foreign substances present in the housing.

12. The air-conditioning system of claim 11, wherein the controller is configured to control opening and closing of the first door and the second door according to predetermined control logic for a previous situation in response that a predetermined time period elapses after completion of the cleaning mode.

13. The air-conditioning system of claim 12,
    wherein the heat exchange unit includes a heat exchanger and a blower, and
    wherein the controller is configured to perform the cleaning mode during travel of the mobility vehicle, and to perform control so that the blower is not driven during the cleaning mode.

14. A method of controlling the air-conditioning system of claim 1,
    wherein, in response that a travel speed of the mobility vehicle is equal to or greater than a predetermined speed, the controller is configured to check a travel direction of the mobility vehicle, and wherein, in response that the travel direction is a forward direction of the mobility vehicle, the controller is configured to perform control so that at least one door mounted in front of the housing among the plurality of doors is opened and at least one door mounted in rear of the housing among the plurality of doors is closed.

15. The method of claim 14,
wherein, in response that a travel speed of the mobility vehicle is equal to or greater than a predetermined speed, the controller is configured to check a travel direction of the mobility vehicle, and
wherein, in response that the travel direction is a backward direction of the mobility vehicle, the controller is configured to perform control so that at least one door mounted in front of the housing among the plurality of doors is closed and at least one door mounted in rear of the housing among the plurality of doors is opened.

16. The method of claim 14, wherein, in response that a travel speed of the mobility vehicle is lower than a predetermined speed, the controller is configured to perform control so that at least one door mounted in front of the housing among the plurality of doors and at least one door mounted in rear of the housing among the plurality of doors are opened.

17. The method of claim 14, wherein, in response that the mobility vehicle accelerates in a state in which a travel speed of the mobility vehicle is equal to or greater than a predetermined speed, the controller is configured to perform control so that an amount of opening of at least one door mounted in front of the housing among the plurality of doors or at least one door mounted in rear of the housing among the plurality of doors is reduced.

18. The method of claim 14, wherein, in response that the mobility vehicle decelerates in a state in which a travel speed is equal to or greater than a predetermined speed, the controller is configured to perform control so that an amount of opening of at least one door mounted in front of the housing among the plurality of doors or at least one door mounted in rear of the housing among the plurality of doors is increased.

19. The method of claim 14,
wherein the heat exchange unit includes a heat exchanger configured to allow a refrigerant to flow therethrough, and
wherein the controller is configured to control an amount of opening of at least one door mounted in front of the housing among the plurality of doors or at least one door mounted in rear of the housing among the plurality of doors according to an amount of heat exchange with the heat exchanger.

20. The method of claim 14, wherein the controller is configured to perform control so that at least one door mounted in front of the housing among the plurality of doors and at least one door mounted in rear of the housing among the plurality of doors are opened in performing a cleaning mode to remove foreign substances present in the housing.

* * * * *